United States Patent [19]
Johnson

[11] Patent Number: 6,078,946
[45] Date of Patent: *Jun. 20, 2000

[54] SYSTEM AND METHOD FOR MANAGEMENT OF CONNECTION ORIENTED NETWORKS

[75] Inventor: William A. Johnson, Plano, Tex.

[73] Assignee: First World Communications, Inc., Greenwood Village, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/707,949

[22] Filed: Sep. 10, 1996

[51] Int. Cl.$^7$ ........................................ G06F 17/00
[52] U.S. Cl. .......................... 709/200; 709/238; 709/241
[58] Field of Search .................... 395/200.36, 200.68, 395/200.7, 200.71, 23, 22; 364/242.94, 284.4, 274.9; 370/238

[56] References Cited

U.S. PATENT DOCUMENTS

| | | | |
|---|---|---|---|
| 4,873,517 | 10/1989 | Baratz et al. | 340/825.03 |
| 5,383,164 | 1/1995 | Sejnowski et al. | 67/134 |
| 5,455,854 | 10/1995 | Dilts et al. | 379/201 |
| 5,477,444 | 12/1995 | Bhat et al. | 364/152 |
| 5,490,232 | 2/1996 | Asano et al. | 395/10 |
| 5,509,123 | 4/1996 | Dobbins et al. | 395/200.15 |
| 5,524,176 | 6/1996 | Narita et al. | 395/22 |
| 5,559,707 | 9/1996 | Delorme et al. | 364/443 |
| 5,561,790 | 10/1996 | Fusaro | 395/500 |
| 5,586,219 | 12/1996 | Yufik | 395/20 |
| 5,636,328 | 6/1997 | Kautz et al. | 395/50 |
| 5,664,066 | 9/1997 | Sun et al. | 395/23 |
| 5,822,301 | 10/1998 | Arnold et al. | 370/238 |

*Primary Examiner*—Stuart S. Levy
*Assistant Examiner*—Tod Kupstas

*Attorney, Agent, or Firm*—Brown, Martin, Haller & McClain

[57] ABSTRACT

The system and method for provisioning resources in a network provides real time, parallel evaluation of the best path within the network using neural network principles. Elements of the network having a plurality of paths are assigned relative values according to a network user's requirements. Attributes may include factors such as reliability, cost, speed, distance, expandability, etc., and may be static or dynamic. Selection of a best path from the plurality of paths comprises application of fuzzy logic, using a threshold function to identify a best relative path value by providing an input to the function which is a combination of the attribute values of the elements within each path. The input to the function is the sum of weighted attribute values, where each attribute value is multiplied by a weight which is a relative value determined in accordance with the network user's priorities; the higher the priority, the greater the weight applied to that attribute. Computation of the threshold function is performed for each path and the resulting values are compared to a pre-determined threshold value to determine if the threshold has been crossed. If a single optimal path has not been identified during this step, the weights of the various attributes are adjusted in order of their priority; upward if no paths have crossed the threshold and downward if multiple paths have crossed the threshold. The process is continued with increasingly smaller incremental changes in the weights until a single combination of elements provides a path value which crosses the threshold, indicating the best path for meeting the network user's criteria. The threshold function may be any algorithm which provides a threshold, including sigmoid, linear, exponential and quadratic functions.

24 Claims, 5 Drawing Sheets

Microfiche Appendix Included
(1 Microfiche, 74 Pages)

SYSTEM AND METHOD FOR MANAGEMENT OF CONNECTION ORIENTED NETWORKS

BACKGROUND OF THE INVENTION

Portions of the following disclosure, including any appendices, contain material that is subject to copyright protection. The copyright owner has no objection to the facsimile reproduction of the patent document or the patent disclosure as it appears in the Patent and Trademark Office records, but otherwise reserves all rights in the copyrighted material.

1. Field of the Invention

The present invention relates generally to a system and method for network management for allocating, selecting and managing resources in an interconnected network and more specifically, to a system and method for network management that uses fuzzy logic principles.

2. Background and Related Art

Networks, consisting of a large number of interconnected points, are formed in many different physical systems. For example, where the points are cities, they may be interconnected by numerous roads and highways, or airline routes, which offer multiple possible pathways to travel from one city to another, or power lines in a large area power grid. The points and interconnecting routes form the network. Nonetheless, what may come to mind first when defining a network is the technological application of the term relating to conduction of an electromagnetic signal between points which are connected by many sections of a conducting medium. The electromagnetic (EM) signal may be electricity or light, which may be conducted through metal wire or cable, or fiber optics, respectively, or may be a broadcast EM signal such as radio frequency (RF) or microwave. The points may be anything capable of receiving and/or transmitting a signal, for example, for purposes of communication or power transmission. In any such network, differences may exist within the interconnections which indicate that one route or pathway may be more desirable than others which would still be capable of achieving the desired transmission. Given the large number of choices offered by the network, a problem arises in managing the transmission from one point to another to handle the signal in the most economical, reliable and/or efficient manner.

In the area of communications, increased demands are rapidly approaching, if not already exceeding, the limits of existing communications networks, both in the areas of bandwidth and speed, particularly in many municipalities and other regions that have communications systems that are many decades old. Expandability of these networks also introduces a significant limitation. Most existing local exchanges rely on electronic transmission of analog signals, typically with separate networks for voice and/or data, and video. As new fiber optic communications networks are being installed, bandwidth, speed and expandability are greatly improved, however, much of the management of these networks is still based on principles established for older wire-based analog systems.

Traditional communications systems are built around a discrete set of subsystems, which, although they may be highly integrated, still act as separate parts. For example, a typical PBX (private branch exchange), although interfaced with an external community network, has its own routing protocols and other functional characteristics which may differ from another PBX connected elsewhere to the community network. The external network has a centralized routing layer which determines to which interface an information packet is to be forwarded, requiring that the central layer have knowledge of each specific interface, and further requiring modification of the central layer if a new interface is added. Some workers in the technology have addressed this issue by utilizing object-oriented methodology, by which the interfaces become "objects", each being encapsulated so that it knows how to receive and what to do with the information packet, independent of the community network. Examples of such systems are provided in U.S. Pat. No. 5,455,854 of Dilts, et al., entitled "Object-Oriented Telephony System", and U.S. Pat. No. 5,509,123 of Dobbins, et al., entitled "Distributed Autonomous Object Architectures for Network Layer Routing", the disclosures of which are incorporated herein by reference.

While incorporation of object-oriented methodology into a network's operations addresses the problems of interfacing for purposes of access and remote management, the operations still rely upon computer control systems which operate on (1) discrete packets of data handled serially (data being defined as any information signal conveyed through the network, including voice, data and video); (2) a memory system which records data to be processed, a sequence of specific instructions on how to process the data, and the answers to that result; and 3) the system operates by a continuous cycle of fetching an instruction from memory (along with any necessary data items), executing that instruction, and storing the result of the instruction, if any, back into memory. In essence, the network operates like a computer having a von Neumann architecture. For example, suppose a telecommunications network has a number of different paths by which a telephone call can be placed between Syracuse, N.Y. and San Diego, Calif. The control system will have in its memory a list of preferred paths, which typically ranges from the shortest distance to the greatest distance between two points, e.g., "least cost routing", or will have in its memory an algorithm which determines, at any given time, the lowest cost path. Path length is easily quantifiable, and the system controller needs only to find the lowest number. If that preferred path is unavailable, it will proceed to the next longer path, under the assumption that the next longer path will be the next lower cost. This assumption is valid since the shortest route usually contains the least amount of costly equipment.

However, the cost of using any given path is not as simple as mere comparison of distances to find the shortest path. Capacity versus existing customers on a particular path, i.e., loading, can make it very expensive, since increased usage of that path ultimately requires expansion. Performance and reliability are among other issues that can effect the choice of paths. In order for the above system controller to consider all of the possible variables that impact cost of a particular path, a complicated algorithm would be required, which would have to applied serially to each of the many possible paths and variables, and could produce a large number of solutions. The network speed would be severely impacted by the delay while the centralized controller considered all of the possible paths, which would further make the tasks of monitoring traffic and status, billing, and service activation, among others, more of a challenge.

Numerous networks and network-like systems which have many alternative "paths" available present similar problems in decision-making processes for allocation of resources, e.g., selection of paths. Electrical power distribution is one example, especially in view of future deregulation of power companies that will open up the industry to competition such that customers can select their own power company, and interconnecting networks of power transmission lines are accessed by many different carriers. An example of a network-like system which has many possible paths and variables is an airline reservation system and process.

Computer systems based upon neural network architecture are known for their uses in character recognition and other organizational and classification functions. Neural networks are composed of a number of simple processing elements that communicate through a set of interconnections with variable weights and strengths. The processing elements are generally grouped into layers, with an input layer, an output layer, and one or more middle layers. The network's memory is stored or represented in the pattern of variable interconnection weights among the processing elements. Information is processed by a spreading, constantly changing pattern of activity distributed across many processing elements. A neural network is trained rather than programmed. The training program adjusts the weights assigned to the inputs to the processing element to control, giving more weight to those elements which provide the best results, i.e., the most correct answer to a set of input training data for which the answer is known. The operation of the neural network is governed by three properties: (1) the transfer function of the processing elements, (2) the details of the structure of the connections among the processing elements, and (3) the learning rules that the system follows. The logic used by a neural network is often referred to as "fuzzy logic" since it deals with probabilities rather than mathematical certainties.

In view of the disadvantages of management by serial processing in a conventional network, even when the network is based upon object-oriented principles, it would be advantageous to devise a communications network architecture and management method which utilized the parallel, high speed capabilities of a neural network. It is to such an object that the present invention is directed.

BRIEF SUMMARY OF THE INVENTION

In a network comprising a plurality of nodes and interconnecting pathways, each node and pathway is an object that is managed within the network. The network may provide any type of communication or conduction system using an electromagnetic signal, including, but not limited to, PBX (private branch exchange), VPN (virtual private network), LAN (local area network), WAN (wide area network), and MAN (metropolitan area network), using electrical and optical signals, including electrical power supply networks, or may be a system which involves selection of a pathway from a network of pathways for physical movement from a source to a destination. The objects of the network are assigned relative values, or attributes, and one or more method which operates on the value of the attributes, according to a network user's requirements, in a procedure known in object-oriented terminology as "encapsulation". Attributes may include factors such as reliability, cost, speed, distance, expandability, etc., and may be static or dynamic. The assigned relative values may be based on an arbitrary numbering scheme. Selection of a best pathway or series of pathways from the plurality of pathways comprises application of fuzzy logic, using a threshold function to identify a best relative pathway value by providing an input to the function which is a combination of the attribute values of the elements within each pathway. The input to the function is the sum of weighted attribute values, where each attribute value is multiplied by a weight which is a relative value determined in accordance with the network user's priorities; the higher the priority, the greater the weight applied to that attribute. Computation of the threshold function is performed for each pathway and the resulting values are compared to a pre-determined threshold value to determine if the threshold has been crossed. If a single optimal pathway has not been identified during this step, the weights of the various attributes are adjusted in order of their priority; upward if the sum of the weighted values for each pathway has identified no pathways which cross the threshold and downward if multiple paths have crossed the threshold. The process is continued with increasingly smaller incremental changes in the weights until a single combination of elements provides a pathway value which crosses the threshold, indicating the best pathway for meeting the network user's criteria. The threshold functions i.e., the transfer function, may be any algorithm which provides a threshold, including sigmoid, linear, exponential and quadratic functions.

In an exemplary embodiment, the network is a fiber optic communications network with sets of nodes connecting the fiber optic cables. Individual network segments, which are two nodes connected by a cable, are identified as "trails". The nodes may be start, end, or intermediate nodes. Each trail has a number of attributes which can be combined to determine the relative desirability of the trail. The nodes may also have their own attributes which bear upon the overall desirability of the path(s) in which they fall. A group of trails and nodes that make up end-to-end circuits (source to destination) are called "paths". A path possesses the attributes of all of the trails and nodes it includes. Attributes that may be assigned to a trail include cable length, installation method, e.g., buried cable or aerial cable, cost to expand, number of fibers in the cable, etc. Attributes of a node may include switching speed, conversion rate (e.g., for a termination node where an optical signal is converted to electrical), signal loss, interference, etc. An arbitrary scale can be assigned for valuation of the attributes. For example, $-5$ to $+5$, with a higher number designating greater desirability. For a trail, the most reliable installation method, cable buried at greater depths, would be assigned $+5$, while the least reliable installation method, low aerial cable, would be assigned $-5$. The most expensive to expand would rate a $-5$ and the least expensive would be $+5$. Intermediate values would be applied to attributes which fall in between the worst and the best. The attribute values multiplied by the weights are summed for each trail to determine an input value to be operated on by the sigmoid function, the transfer function selected for the preferred embodiment. The initial calculation can be performed by setting all weights at 1, or the weights can be assigned values relative to their respective desirability, to provide a baseline starting point. The sum of the weighted attributes for each trail is operated on by the transfer function, in this case a sigmoid function, to provide a threshold value, which, although somewhat arbitrarily determined, still provides a clear indication of crossing. The relative weights would are determined based upon an individual customer's requirements. For example, if the customer was not as concerned with installation method as it was with cost to expand in a particular trail, the cost to expand value might be assigned a greater weight value, e.g., 0.8 compared with 0.6, in that trail. As with the attribute values, the weights are selected as relative values, not representative of any actual value, and the scale used is not critical. If two attributes are of equal importance, they may be assigned the same weight initially, however, there may ultimately be some variation following the iterative process to identify the single best trail. Weights may also be different from one trail to another, based upon the customer's priorities and the particular attributes of that trail. Fiber length may be the most important attribute of one trail, while the cost to expand may be the most important in another.

The best trail among a number of trails under consideration is determined by adjusting the weights in order of their priority. In a path where fiber length is most important, the weight for this attribute will be increased first. In a path where cost to expand is critical, this weight will be increased in the first iteration. If these adjustments do not cause the calculated value of any single trail to cross the threshold, the same weight may be adjusted again, or the second priority weight is adjusted upward for each path. (The latter choice may be preferred in order to preserve the customer's relative priority scale for the different attributes.) Each subsequent priority weight will be adjusted and, if no single trail is indicated as the best, i.e., crosses the threshold, the process will be repeated, adjusting the weights in order of priority until a single path has a calculated value which crosses the threshold. If more than one calculated trail value crosses the threshold, the weights may be decreased. To preserve the customer's relative priorities, the lowest weight will be decreased first, followed by another downward adjustment of the same weight, or by downward adjustment of the weight for next highest priority attribute.

In a second example of a system and method for management of a network is an airline reservations system which allows selection of the best path from a passenger's source to the desired destination. Each of the paths consists of one or more trails which interconnect the source to the destination. Physical attributes can include cost, capacity, time of day, number of stops, meal service, in flight movie, type of plane, etc., i.e., anything that a passenger might consider in selecting a particular flight. These are then assigned numerical attributes. As in the first embodiment, the passenger establishes his or her priorities for the various attributes to provide the weights which are then applied to the attributes of the different trails within the network of available flights. Using the iterative process, a single route is identified as having the best combination of attributes to suit the passenger's needs.

The system and method for management of network resources provide real time, parallel evaluation of the best path within the network using neural network principles and fuzzy logic, where elements of the network have many different attributes which effect the overall desirability of any given path. Rather than requiring calculation of actual numbers for allocating network resources, which can easily be done where only one attribute is considered, the inventive system and method utilizes relative values which are calculated using relative priorities for multiple attributes as determined by the network user, selecting the best choice as the first choice that crosses a pre-determined threshold, regardless of the actual numerical value.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

The following detailed description is provided in the form of exemplary applications of the inventive system and method to telecommunications networks. For purposes of this disclosure, the term "telecommunications networks" includes any system of interconnected points through which an electromagnetic signal, typically optical or electrical, can be uni- or bi-directionally conducted from one point in the network to another by any of a number of routes or pathways within the network. The signal may be voice, data, or video, or combinations thereof (e.g., multimedia). The points, or nodes, of the network will include any active or passive electronic or optical device required to transmit a signal within and between pathways, such as internetworking equipment, hubs, gateways, bridges, routers, switches, multiplexers, transceivers, etc., as well as termination points such as telephones or private telephone exchanges, fax machines, computer equipment, printers, audio or video receivers, generically, "network termination equipment" or "NTE", or customer premises equipment ("CPE"). The geographical size of the network can be as small as a private intraoffice computer network, nationwide public and private networks, or even international networks.

Figure 1:
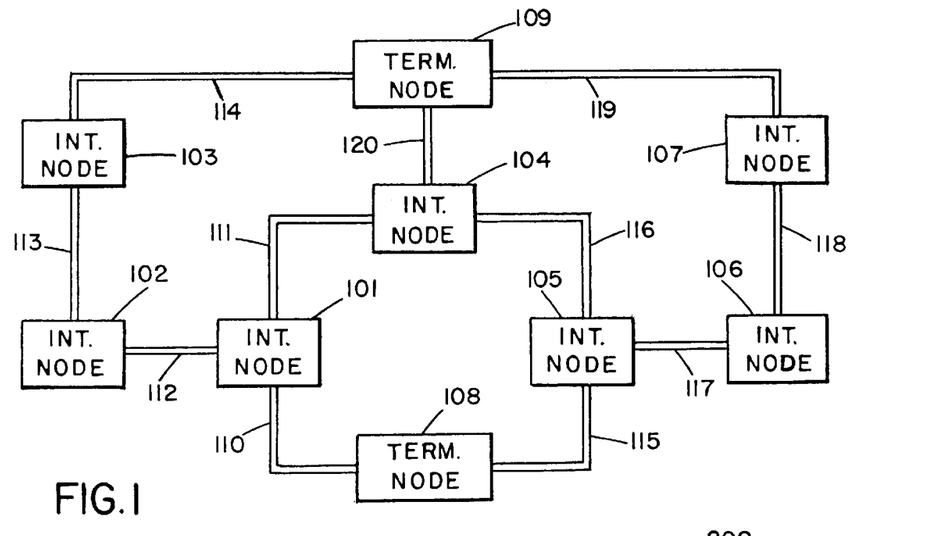
FIG. 1 is a block diagram of a telecommunications network in an object hierarchical relationship.

In an exemplary embodiment illustrated in FIG. 1, the network is a fiber optic communications network with sets of intermediate nodes 101–107 interconnected by fiber optic cables 110–120 with termination nodes 108–109 at the customer usage points. Each of the nodes and interconnecting fiber optic cables becomes is "object" (in the object-oriented sense) within the network, "object" being defined as any real-world entity such as a piece of equipment, a fiber optic cable or a customer. A control processor for managing and/or monitoring the network can be embedded in one of the nodes 101–109, or can be connected anywhere in the network at a separate node (not shown). For illustration purposes, let node 108 house the control processor which determines how a signal might be communicated from node 108 to node 109.

Each object has an object identifier which is a unique, system-wide identifier used to navigate through a complex network of objects. As illustrated, each object is identified by its own unique reference numeral, however, in an actual system, component serial numbers, or any unique designation can be assigned to any given object.

Individual network segments, which are two nodes connected by a cable, are identified as "trails", e.g., the combination of nodes 108,101 and cable 110, and will be the object described above. Each trail has a number of attributes which can be combined to determine the relative desirability of the trail. A group of trails that makes up end-to-end circuits are called "paths", e.g., trail 108,110,101 plus trail 101,111,104 plus trail 104,120,109. A path possesses the attributes of all of the trails and nodes it includes from end to end.

Attributes of any given element or object within a path are based upon physical variables that are present within a particular class of elements. All elements within a class will have the same number of attributes, even if the attribute values are different. Physical attributes that may be assigned to a trail include reliability, cable length, installation method, e.g., buried cable or aerial cable, cost to expand, number of fibers in the cable, etc. Attributes of an individual node within a trail, which could add to or modify the trail attributes may include switching speed, conversion rate (e.g., for a termination node where an optical signal is converted to electrical), signal loss, interference, etc. The physical attributes are converted by an arbitrary scale to provide a numerical value which can be identified as neural attributes, in effect, converting the "object" into a processing element or "neuron" of a neural network having input values representative of the object's attributes. For example, −5 to +5, with a higher number indicating greater desirability. Note that any scale can be used, since the values are provided to indicate relative values only. For a trail, reliability is strongly influenced by how the cable is installed. The most reliable installation method, e.g., cable buried at greater depths, would be assigned +5, while the least reliable installation method, low aerial cable supported by a short telephone pole, would be assigned −5. Within this range, a cable that is buried at shallower depths have a lower value than deeper cable, and a cable supported on a taller telephone pole would have a higher value than one on a short pole. The following Table 1 provides an example:

TABLE 1

| PHYSICAL ATTRIBUTE | NEURAL ATTRIBUTE |
|---|---|
| BURIED CABLE @ 8 FT. | +5 |
| BURIED CABLE @ 4 FT. | +3 |
| HIGH AERIAL CABLE | −3 |
| LOW AERIAL CABLE | −5 |

It should be noted that it is not necessary to always have values spanning an entire scale since, for example, a network may not have any low aerial cable, so that the scale ranges from −3 to +5. On the other hand, if the network has no low aerial cable, it would also be appropriate to assign the value of −5 to the least desirable possibility within the class of objects, which, in this case, would be high aerial cable. This flexibility derives from the fact that only the relative values are important, and actual numerical values are not of concern.

Another aspect of reliability of a trail is the cable length. For purposes of this example, a longer cable is considered less reliable due to the increased opportunity for damage, although in a total path consideration, a longer cable may be favored over a series of shorter trails connected by less-reliable nodes. For the physical attribute of cable length (in kilometers), the following values can be assigned.

TABLE 2

| PHYSICAL ATTRIBUTE | NEURAL ATTRIBUTE |
|---|---|
| 0–20 KM | +5 |
| 21–45 KM | +3 |
| 46–70 KM | 0 |
| 71–120 KM | −3 |
| 121–170 KM | −5 |

Another consideration in identifying the preferred trail is whether than trail has sufficient capacity to handle increased traffic and, if not, how much would it cost to expand that trail to increase bandwidth. Table 3 provides the corresponding neural attributes for cost to expand (in dollars):

TABLE 3

| PHYSICAL ATTRIBUTE | NEURAL ATTRIBUTE |
|---|---|
| 0–100 K | +5 |
| 101–200 K | +3 |
| 201–300 K | 0 |
| 301–400 K | −3 |
| 401–500 K | −5 |

Figure 2:
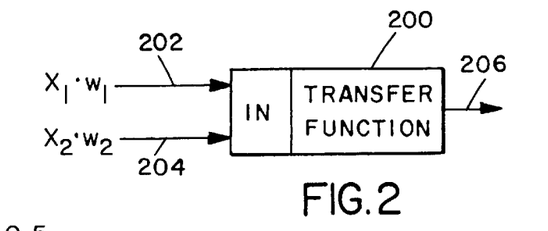
FIG. 2 is a diagrammatic view of an exemplary neuron of a neural network.

The neural attribute values themselves do not change unless some physical change is made to the trail, e.g., low aerial cable reinstalled as buried cable. (Note that this is not necessarily true for dynamic attributes discussed below.) However, the neural attributes may be modified in the same manner that the inputs to a processing element in a neural network would be, i.e., by attaching weights to the inputs of a neuron which then control the influence of the individual inputs on the output of the neuron, and may even determine whether that neuron plays any role in the overall output of the network. Using the simple illustration of a neuron 200 provided in FIG. 2, input 202 receives input $X_1$ and has an attribute weight of $w_1$, input 204 receives input $X_2$ and has an attribute weight of $w_2$, resulting in a net input of:

$$IN = X_1 \cdot w_1 + X_2 \cdot w_2 \qquad (1)$$

The resulting value is then operated on by the transfer function of the processing element to relate the weighted net input to the output. The transfer or threshold function may be any algorithm which provides a threshold, including sigmoid, linear, exponential and quadratic functions. In the preferred embodiment, a sicmoid function is used, such that the neuron's output 206 is $$OUT = \frac{1}{1 + \exp(-k \cdot IN)}, \qquad (2)$$

where k is a parameter that can have different values for different neurons.

Figure 3A:
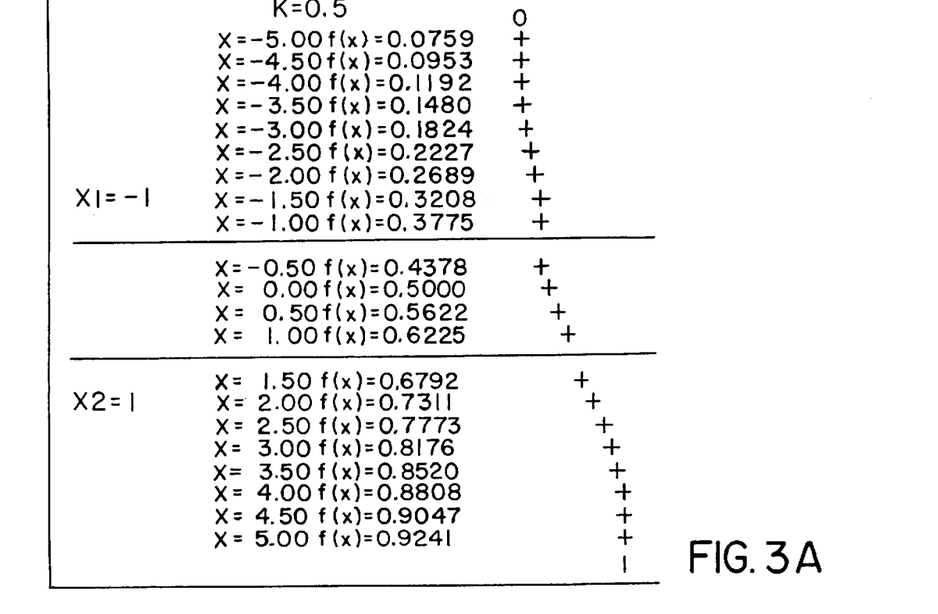
FIG. 3A is a plot of a sigmoid function where k=0.5.
Figure 3B:
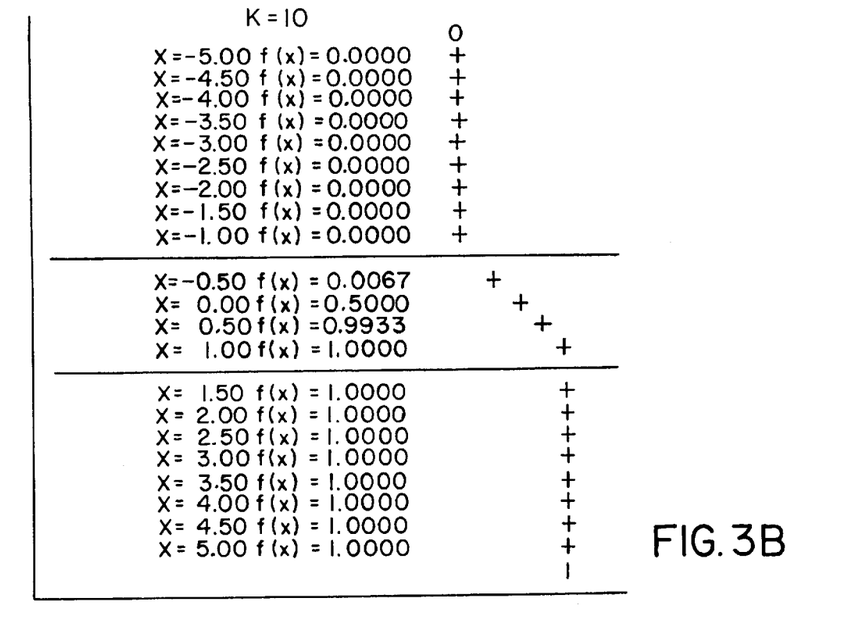
FIG. 3B is a plot of a sigmoid function where k=10.

FIGS. 3A and 3B are signmoid curves derived using equation (2), with the values listed to the right of each curve being the x=IN and f(x)=OUT, and the value of k being 0.5 in FIG. 3A and 10 in FIG. 3B. (The vertical axis is "x", and the horizontal axis is "f(x)".) It is apparent at the center regions of the curves that as k is made larger, the center becomes steeper, such that a hard threshold function is provided. At and above the threshold, which from FIG. 3B, is at x=1, the neuron produces an output of "1". Below the threshold, the neuron's output is "0". (This is well known as a McCulloch-Pitts neuron.) Where IN is the weighted sum of two inputs, as in equation (1), it must exceed the threshold T in order to produce an output. Where each input $X_1$ and $X_2$ is either 1 or 0, $w_1$ and $w_2$ are the weights attached to the inputs, and T is the threshold. For the pairs of inputs [00], [01], [10], and [11], the requirements for the neuron to fire reduces to:

$0 \geq T$ $w_1 \geq T$ $w_2 \geq T$ $w_1 + w_2 \geq T$

If T is chosen to be a positive number and the weights $w_1$ and $w_2$ are positive numbers less than T, the neuron will not fire when presented with input patterns of [00], [01], or [10]. However, if $w_1$ and $w_2$ are such that $w_1+w_2$ is greater than or equal to T, the neuron will fire when it receives the pattern [11].

If $w_1$ and $w_2$ are chosen so that each of them is at least equal to T, the neuron will fire when it detects patterns [01], [10], and [11], but will not fire if it detects the pattern [00]. With this different choice of weights and thresholds, the neuron makes a different kind of distinction between the four possible input patterns. By properly selecting the weight values for the inputs and the threshold value, the neuron can be used to differentiate among input patterns.

Returning to the previous example for comparison of different trails, the weighted sum of three inputs must exceed the threshold in order to meet the criteria. Identifying the above attributes as A, B and C, for installation, length and cost to expand, respectively, the weighted attributes for a given trail can be summed to provide the net input value $$IN_x = A_x \cdot w_A + B_x \cdot w_B + C_x \cdot w_C. \quad (3)$$

In hypothetical trails 1, 2 and 3, trail 1 is a fiber optic system that is 50 km long, its cable is buried 8 feet deep, and the cost to expand the trail is $150,000. Trail 2 is 25 km long, has a high aerial cable installation, and costs $350,000 to expand. Trail 3 is 75 km long, its cable is buried 4 feet deep, and the cost to expand is $500,000. Weighting of the different attributes determined by a particular customer's priorities. These priorities may depend on such considerations of environment, available equipment and personnel, delay, etc., and thus will need to be determined by the customer. Continuing the hypothetical, in this case, the customer's priorities are, in descending order, shortest trail, cost to expand, and method of installation. Given a weight range of 0 to 1, which is arbitrarily selected only to give relative, rather than real, values, initial values may be assigned to give a weight ($w_B$) of 0.8 to shortest cable length, $w_C$=0.6 for least cost to expand, and $w_A$=0.4 for installation method. Referring back to Tables 1–3 to assign neural values to each of the physical attributes of trails 1, 2 and 3, which are then substituted into equation (3), the input values which will provide cross the threshold to provide a "1" (where "1" means "on") output for the trail, for each of the three trails, can be determined.

$$IN_1 = (5 \cdot 0.4) + (0 \cdot 0.8) + (3 \cdot 0.6) = 3.8 = T_1;$$

$$IN_2 = (-3 \cdot 0.4) + (3 \cdot 0.8) + (-3 \cdot 0.6) = -0.6 = T_2;$$

$$IN_3 = (3 \cdot 0.4) + (-3 \cdot 0.8) + (-5 \cdot 0.6) = -4.2 = T_3.$$

It should be noted that weights may be different from one trail to another, based upon the customer's priorities and the particular attributes of that trail. Fiber length may be the most important attribute of one trail, while the cost to expand may be the most important in another. Further, attributes may be static, such as cable length, or may be dynamic, for example, variations in reliability due to temporary environmental conditions such as severe weather, or earthquakes. (For example, otherwise highly reliable, deeply buried cable may become much less desirable in southern California during periods of increased seismic activity.) Other dynamic attributes can include active construction in an area, fires, terrorist threats or civil unrest, among other things that may be temporary or difficult to predict.

Some segments of a network may have some attributes which are not of concern for others. This is dealt with using principles of object-oriented computing, in which a "class" is defined as all objects having the same set of attributes (not necessarily the same attribute values.) In the examples provided herein, trails are a class, since they have the same attributes and methods. If more detailed considerations of certain trails are required, a sub-class is defined which inherits all of the attributes of the class, and has additional attributes unique to the sub-class. For example, if trail refers to any interconnection through which electromagnetic transmission can occur, fiber optic cables would be a sub-class, and could have the additional attribute of number of fibers. Where sub-classes are present, they will be compared against other sub-classes, while classes are compared against other classes. Since the sub-classes are nested within the classes, the comparison of sub-classes will be considered as an aspect in the determination of the best classes.

For convenience, the initially-determined threshold values are subtracted from their respective equations to provide normalization to zero as follows:

$$A_x \cdot w_A + B_x \cdot w_B + C_x \cdot w_C - T_x = 0. \quad (4)$$

(This step is optional, since the result can also be compared with the threshold itself, however, it is more convenient.)

The best trail among a number of trails under consideration is determined by adjusting the weights in order of their priority. In a path where fiber length is most important, the weight for this attribute will be increased first. In a path where cost to expand is critical, this weight will be increased in the first iteration to emphasize the relative importance of this attribute within the overall evaluation. By varying the weights of an object, e.g., the trail, the good and bad attributes of the object can be brought to the surface and evaluated for their relative importance to the user.

Figure 4:
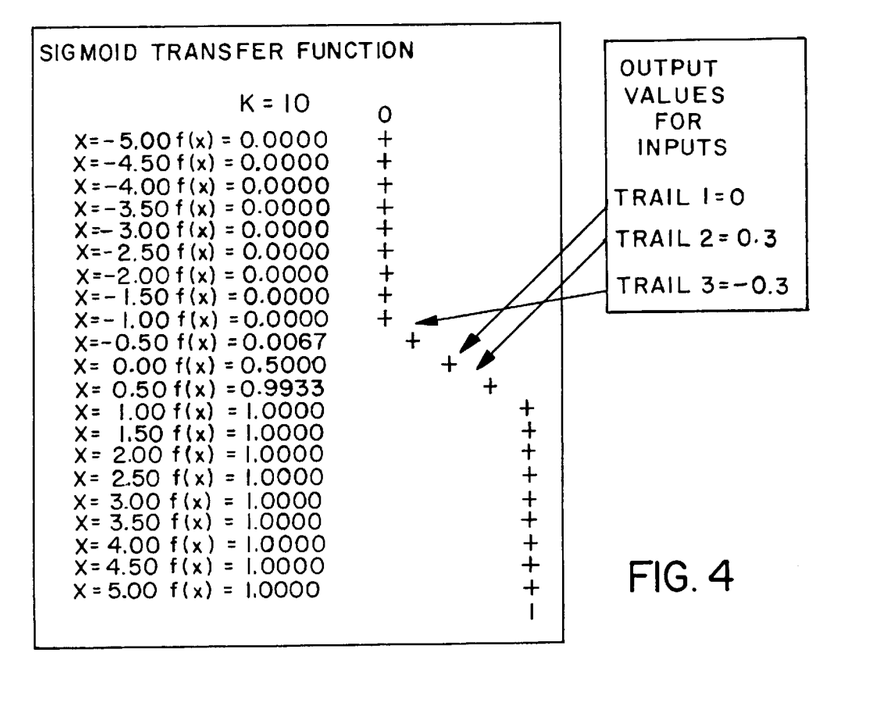
FIG. 4 is a plot of a sigmoid function showing points for trails 1, 2 and 3, after a first adjustment of the attribute weights.
Figure 5:
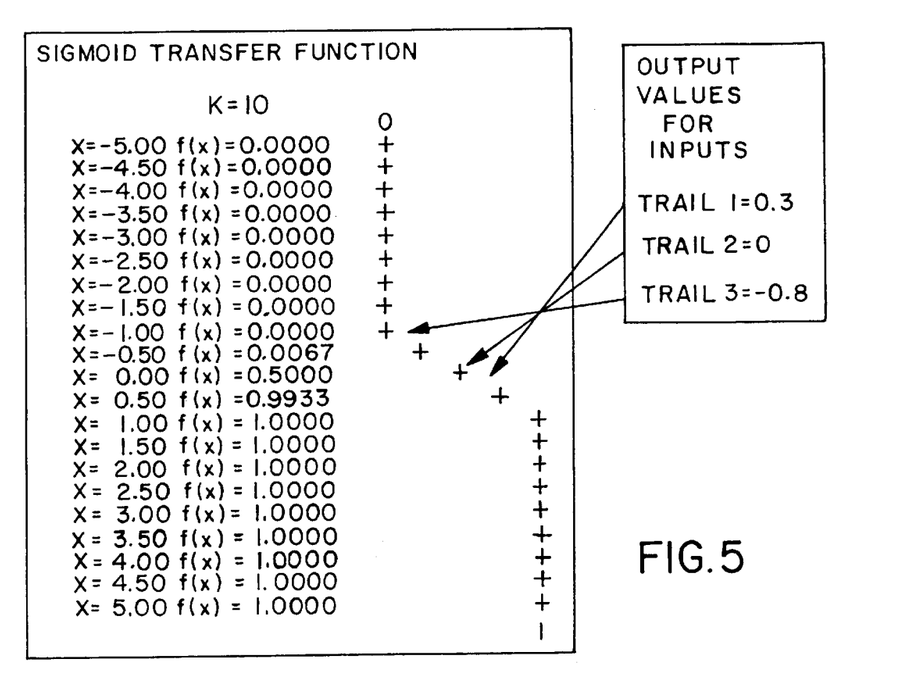
FIG. 5 is a plot of a sigmoid function showing points for trails 1, 2 and 3, after a second adjustment of the attribute weights.

Continuing the example, $w_B$ is increased from 0.8 to 0.9 to provide points along the transfer function plotted in FIG. 4, with trail 1 ending up with an input value of 0, trail 2: 0.3 and trail 3: −0.3. Since the threshold is at 0.5, no input value completely crossed over the threshold. Since this first adjustment did not cause the calculated value of any single trail to cross the threshold, the second priority weight $w_C$ is adjusted upward for each path, in this case, from 0.6 to 0.7. The adjustment of the second highest weight preserves, somewhat, the relative priorities assigned by the customer, however, it is possible to also increment the highest priority weight upward again. Again, as illustrated in the plot of FIG. 5, none of the calculated input values cross over the threshold since trail 1 had an input value of 0.3, trail 2: 0, and trail 3: −0.8. Each subsequent priority weight will be adjusted and, if no trail is indicated as the best, i.e., crosses the threshold, the process will be repeated, adjusting the weights in order of priority until a single path has a calculated value which crosses the threshold.

Figure 6:
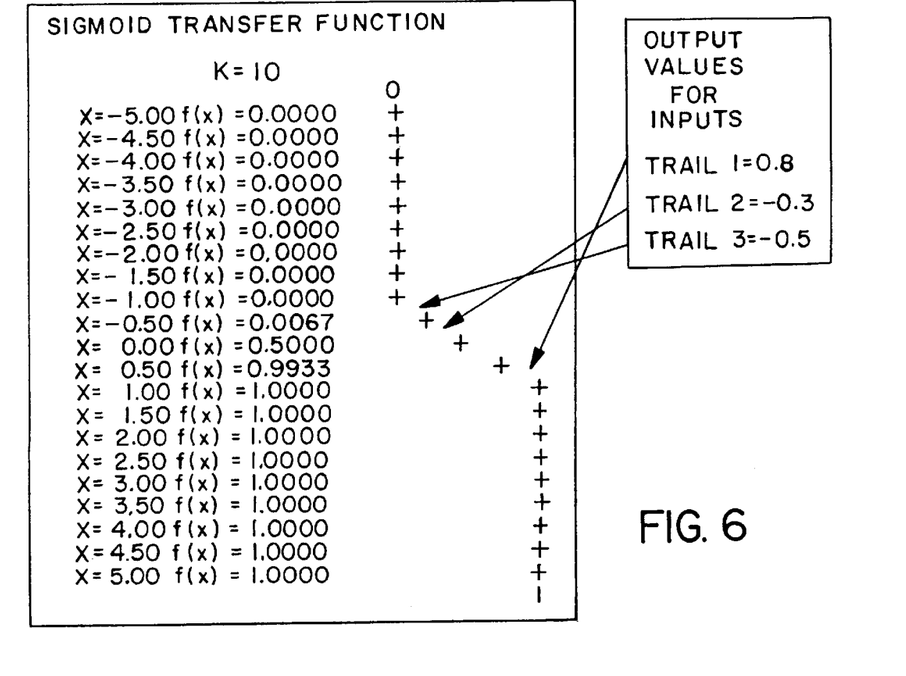
FIG. 6 is a plot of a sigmoid function showing points for trails 1, 2 and 3, after a third adjustment of the attribute weights.

After adjustment of the third priority weight, $w_A$, from 0.4 to 0.5, trail 1 has an input value of 0.8, thus crossing over the threshold, while trails 2 and 3 have input values of −0.3 and −0.5, respectively, and do not cross over. These points are shown in FIG. 6. With trail 1 singled out from the others, it is identified as providing the best combination of qualities to provide the customer with their desired features.

In the event that more than one trail had an input value which crossed the threshold based upon the same weights, the weights would be adjusted downward, with the lowest priority being lowered first, again in order to preserve, as much as possible, the customer's selected priorities, until only one trail had an input value that crossed over the threshold.

The computer program used to implement the iterative procedure, which is described below, includes the ability to adjust the incremental steps for adjusting the weights. For example, again using the scale of 0 to 1, an increment could be 0.1 (as above), 0.05, or 0.01. It may also be desirable to change the incremental value in the latter part of the iterative process to provide fine adjustments when a particular trail is very close to, but has not yet crossed the threshold, or when, in a single adjustment of a weight two or more trails cross the threshold when in the prior step none crossed. In this case, it would be appropriate to back up to the prior value and reduce the incremental increases of the weights until only one trail crossed.

This procedure parallels the learning techniques applied in neural network computing, where input weights for different processing elements, or neurons, are adjusted until the output corresponds to the known correct answer. In this case, the correct answer is that the threshold is crossed by the output from only one node. This iterative process trains the network (by adjusting the weights to provide the correct answer), and can typically be done quite rapidly using a trial and error process.

In the preferred embodiment, the inventive network uses one of the more commonly used training methods for neural networks, which is backward error propagation learning, or backpropagation. In backpropagation, each training pattern is processed in two stages. The first stage involves providing the network with an input pattern to generate a forward flow of activation from the input layer to the output layer. In the second stage, errors in the network's output generate a flow of information from the output layer backward to the input layer. This second stage is used to modify the weights applied to the processing elements, allowing the network to learn. The backpropagation training method, as well as other training methods are well known in the art. (See, e.g., M. Caudill and C. Butler, *Naturally Intelligent Systems*, The MIT Press, 1990.) In the case of the present invention the weights that are modified are the attribute weights, and the "correct answer" is the best path. As will be apparent to those skilled in the art, different variations on the backpropagation method, as well as other neural network training methods may be incorporated into the network to iteratively modify the attribute weights to identify the best path.

Referring back to FIG. 1, the intermediate nodes 101–107 may also have their own attributes or qualities which will bear upon the overall desirability of the path(s) in which they fall without actually requiring definition of a sub-class. The termination nodes 108,109 will also have their own attributes which may effect the attributes of the paths to which they are connected. For example, if the termination node 109, which is an older computer based upon a 386 microprocessor, the speed of data transmission through the incoming path is going to be of little concern, since the computer, itself, is slow. However, on the other hand, since the computer is so slow, it may be very important to assure a noise-free connection because data transmission time will be relatively long, providing an increased opportunity for interference. With this in mind, the attributes of the trail can be weighted to indicate the relative importance of cable length versus other attributes.

Figure 7:
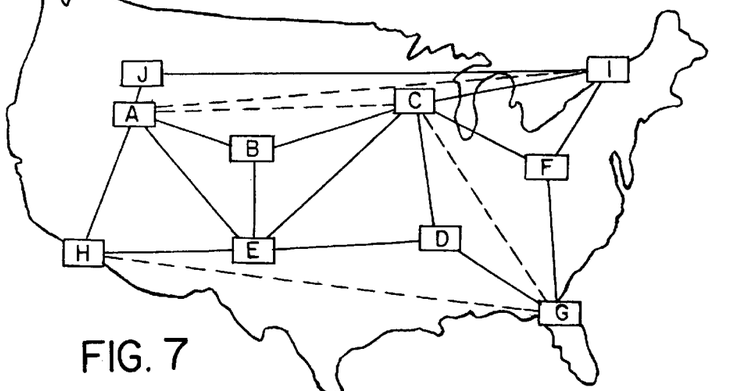
FIG. 7 is a diagram of a hypothetical communications network with a plurality of paths for communication between San Diego and Syracuse.
Figure 8:
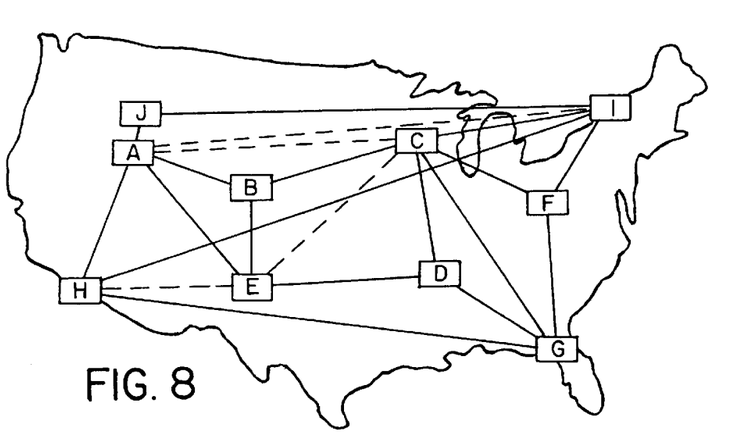
FIG. 8 is a diagram of a modified hypothetical communications network with a plurality of paths for communication between San Diego and Syracuse.
Figure 9:
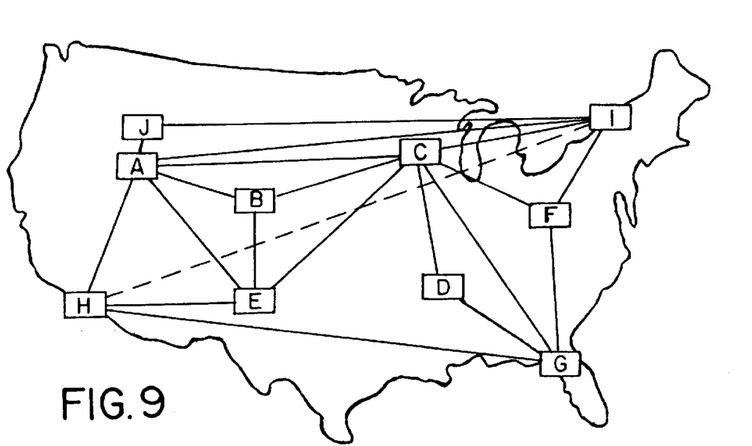
FIG. 9 is a diagram of the modified hypothetical communications network of FIG. 8 with adjusted attribute values in one trail.

FIGS. 7–9 provide an illustration based upon an example first stated in the background of the invention—the telephone call placed between San Diego and Syracuse which is transmitted by a hypothetical nationwide network with a number of different trails. For ease of illustration, the nodes are designated by letters A–J. Translating this into a "real world" hypothetical communications network, the nodes represent switching facilities in the following cities:

TABLE 4

| | |
|---|---|
| A | Salt Lake City |
| B | Denver |
| C | Minneapolis |
| D | Memphis |
| E | Albuquerque |
| F | Cincinnati |
| G | Orlando |
| H | San Diego |
| I | Syracuse |
| J | Boise |

Not all cities are interconnected directly with each other in this hypothetical network, so, in most cases, several switchings or re-directions must occur to complete the transmission between San Diego (H) and Syracuse (I). Each trail connecting a pair of cities has attributes, using the same scale previously used, which are provided in Table 5 below. This table, or one or more similar tables, is stored in the memory of the processor used to perform the comparisons of the trails by iterative calculation of the input values for each trail and applying the transfer function on the input values. The values stored in the processor memory, including the addition or subtraction of trails, can be updated by direct input from the network, or by manual data entry. (Note that these numbers are somewhat arbitrarily selected and do not represent actual conditions.)

TABLE 5

| TRAIL | INSTALLATION | LENGTH | COST TO EXPAND |
|---|---|---|---|
| A–B | 5 | 2 | −2 |
| A–C | 3 | 2 | −2 |
| A–E | 0 | 0 | 0 |
| A–H | −1 | 2 | −5 |
| A–I | 4 | −5 | −3 |
| A–J | 5 | 5 | −2 |
| B–C | −2 | 0 | 4 |
| B–E | 0 | −5 | 3 |
| C–D | 0 | 3 | 1 |
| C–E | 0 | 0 | 0 |
| C–F | 2 | −3 | −1 |
| C–G | 3 | −2 | 0 |
| C–I | −1 | −1 | −1 |
| D–E | −4 | 2 | −3 |
| D–G | 1 | −1 | 5 |
| E–H | 2 | −1 | 5 |
| F–G | 1 | 1 | 1 |
| F–I | −1 | 3 | 0 |
| G–H | 2 | −4 | −4 |
| I–J | −2 | −5 | 5 |

Using the same scale as in the examples above, the attribute weights are assigned values from 0 to 1, with 1 being the highest priority. With installation given a weight $w_A$ of 1 (high priority), cable length having a weight $w_B$ of 0.4 (low priority), and cost to expand having a relatively high priority, with $w_C$=0.8, the least cost route, indicated in FIG. 7 by the dashed lines, was determined to be H-G-C-A-I, or, in real world terms, San Diego to Orlando to Cincinnati to Salt Lake City to Syracuse. (In this and each of the following examples, k=10 in the sigmoid function.)

Using backpropagation, the network software evaluates all combinations of trails which make up each alternate path between San Diego and Syracuse. Each trail is considered without connections, then, once the best trails are identified, they are combined, as appropriate, to provide the best path. As will be apparent from a basic examination of the exemplary values in Table 5, even though a single trail has very desirable attributes, such as A-B, if another trail within the path has relatively undesirable attributes, such as B-C, the combination of trails within a given path must be considered, such that A-B-C-I is not selected as the best path from A to I.

FIG. 8 provides the same general network as in FIG. 7, but adds a direct connection between San Diego and Syracuse (H-I). This trail is assigned neural attribute values of −1, −5, −4. In addition, the neural attribute values for several trails are modified from those provided in Table 5 as follows (which means that the trails have been physically altered to modify their physical attributes):

TABLE 6

| TRAIL | INSTALLATION | LENGTH | COST TO EXPAND |
|---|---|---|---|
| C–E | 3 | −2 | 1 |
| C–G | −1 | −2 | 3 |
| G–H | 2 | −4 | −1 |
| H–I | −1 | −5 | −4 |

Changing the attribute weights to indicate a priority order of installation, cable length, and cost to expand—0.9, 0.6, and 0.3, respectively, resulted in the identification of a best trail of H-E-C-A-I, or, again in real world equivalents, San Diego to Albuquerque to Cincinnati to Salt Lake City to Syracuse, indicated by the dashed line in FIG. 8. This preferred trail was identified even though a direct connection was available between San Diego and Syracuse. However, this connection had negative attribute values for each attribute and, with the weighting, did not result in a crossover of the threshold.

For the variation of FIG. 9, the only change from the attribute values in FIG. 8 was that H-I was assigned values of 5, −5, −4, which indicates that the installation is reliable (deeply buried), the cable length is still very long, and the cost to expand is on the high side. However, with the weighting giving greatest priority to installation method, using the same weights as before (0.9, 0.6, 0.3), the high value of installation for trail H-I, indicated by a dashed line, resulted in its identification as the best, i.e., least cost, trail between San Diego and Syracuse.

Figure 10:
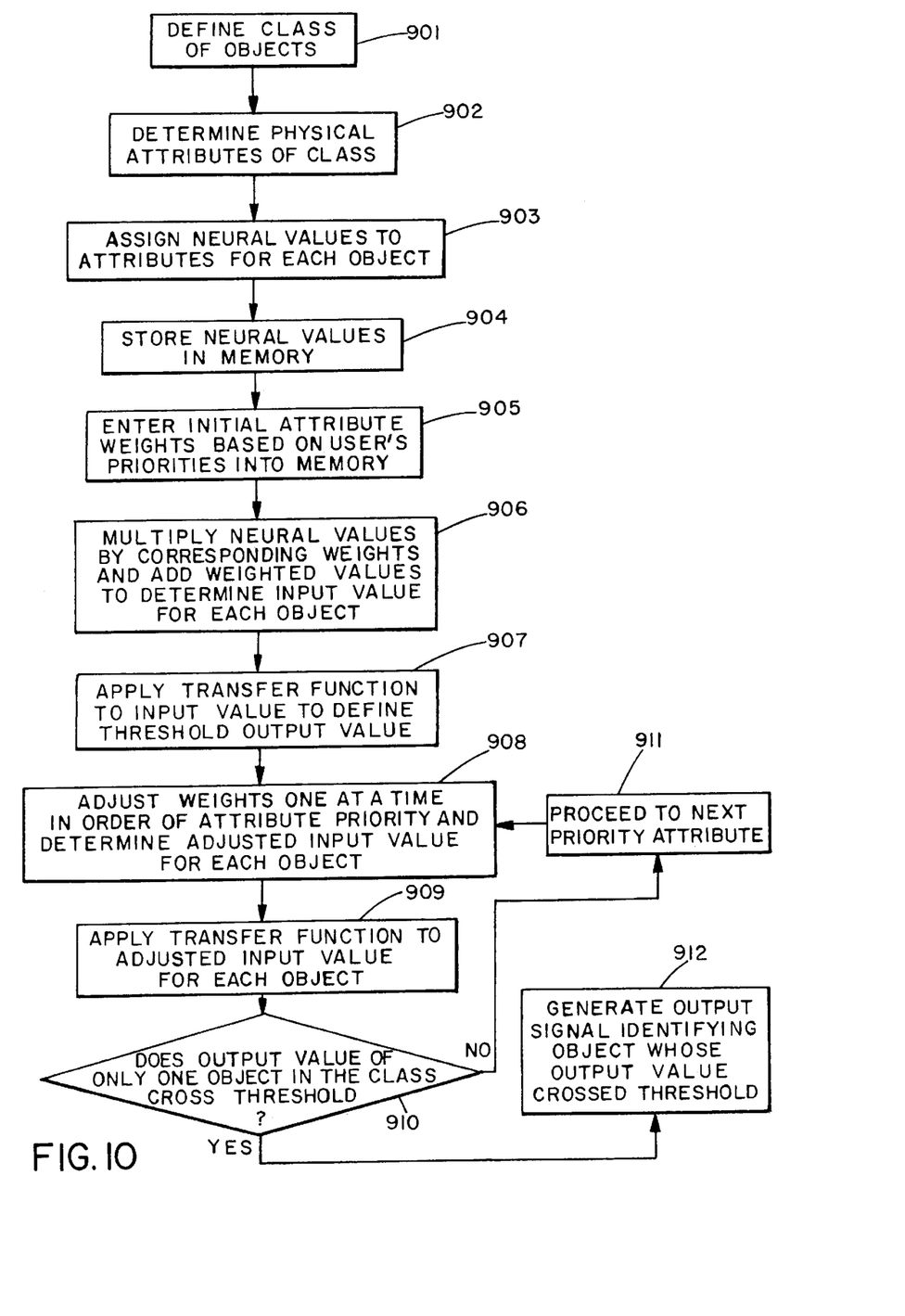
FIG. 10 is a flow diagram of the procedure for identifying a preferred object within a network.

The process for managing a network is summarized in the flow chart of FIG. 10, in which the first step (901) is to identify the class of objects within the network, i.e., to determine the trails and nodes. The second step (902) determines the physical attributes of the class of objects, then the physical attributes are translated into numerical neural attribute values (903), which are fixed values unless and until some physical change is made to an object, and which are stored in the processing system's memory (904). Based upon the network user's priorities, initial attribute weights are assigned (905) to indicate the order of preference of the attributes of the objects and input into the processor. The processor calculates a threshold value by first multiplying each of the neural attribute values by the initial attribute weights (906) stored in memory and summing the products (weighted attributes) of each to provide an input value, then performing a transfer function on the input value for each object (907). Each different object under evaluation will most likely have a different threshold due to their different neural attributes. The weight of the highest priority attribute is increased (908), the weighted attributes are summed and the threshold value determined in step 907 is subtracted to normalize to zero, and a transfer function is performed (909) on the result. The resulting outputs of the objects being evaluated are then compared to determine whether the corresponding threshold has been crossed over by only one of the several objects being compared (910). If not, the next highest priority attribute is addressed (911), and its weight is increased, the modified weighted attributes are summed, to provide an input value (repeating step 908) and the transfer function is performed (step 909) to again determine if crossover occurs by only one of the multiple objects being considered (step 910). Steps 908–911 are repeated until crossover of one of the objects occurs, at which time an output signal is generated by the processor identifying the selected object (step 912). As described above, but not shown in the flow chart, if no single object is identified as crossing over the threshold because more than one of the objects crosses over its threshold, the weights are adjusted downward, with the lowest priority weight being adjusted downward first, progressing from lowest to highest until the single object is identified.

Electrical power can be distributed in much the same manner as in the telecommunications network of the first embodiment. The interconnecting lines will be power transmission cable, with the nodes providing switching, branching, and possibly amplification and noise reduction. Similar attributes can be applied to power distribution, i.e., installation method of cable (e.g., a high aerial may not be the most reliable in an area prone to electrical storms, tornados or hurricanes), cost to expand, capacity, length of cable, etc. Other attributes may include type of electrical generator at the facility supplying the power, costs of operating the generator, reliability, and back-up availability. The customer assigns its own priorities which, as above, are used to weight the numerical neural attribute values to determine an input value for any given object, e.g., transmission cable, within the network.

In a second example, the network management system and method may be used for selection of the best path for an airline passenger from a source to a destination, in which the network comprises airports, which are the nodes, interconnected by flight paths, with are the trails. Using the example of the network illustrated in FIG. 8, a passenger wants to travel from San Diego (H) to Syracuse (I). The passenger wants to find the least expensive flight amongst a number of different possible flights. Physical attributes that can be assigned to a class of flights (the "trails") can include cost, capacity (which would be a dynamic attribute), time of day, number of stops, layover time, meal service, in-flight movie, type of plane, airport safety record, weather (also dynamic), etc., i.e., anything that a passenger might consider in selecting a particular flight. These are then assigned numerical neural attributes. For example, the attributes could be translated as follows:

TABLE 5

| PHYSICAL ATTRIBUTE "A" (COST) | NEURAL ATTRIBUTE |
|---|---|
| <$200 | +5 |
| $201–300 | +3 |
| $301–400 | 0 |
| $401–500 | −3 |
| >$501 | −5 |

TABLE 6

| PHYSICAL ATTRIBUTE "B" (TIME OF DAY) | NEURAL ATTRIBUTE |
| --- | --- |
| LATE MORNING | +5 |
| EARLY AFTERNOON | +3 |
| LATE AFTERNOON/EVENING | 0 |
| EARLY MORNING | −3 |
| RED EYE | −5 |

TABLE 7

| PHYSICAL ATTRIBUTE "C" (MEAL SERVICE) | NEURAL ATTRIBUTE |
| --- | --- |
| MEAL, SNACK & BEVERAGE | +5 |
| SNACK & BEVERAGE | +3 |
| BEVERAGE ONLY | 0 |
| NONE | −3 |

TABLE 8

| PHYSICAL ATTRIBUTE "D" (PLANE TYPE/AGE) | NEURAL ATTRIBUTE |
| --- | --- |
| 777/NEW | +5 |
| MD-90/2 YRS. | +3 |
| 757/10 YRS. | 0 |
| 737/25 YRS. | −3 |
| TURBOPROP/10 YRS. | −5 |

As in the first embodiment, the passenger establishes his or her priorities for the various attributes based up individual needs to provide the weights which are applied to the attributes of the different trails within the network of available flights. Using the four given attributes, suppose the passenger considers cost to be most important, followed by plane type/age, time of day, with meal service last, assigning weights of 0.9, 0.7, 0.4 and 0.1 to these attributes, respectively. To determine the threshold for any given path x in the possible city-to-city trails that would complete transportation from San Diego (H) to Syracuse (I), the weights would be applied as follows:

$$A \cdot w_A + B_x \cdot w_B + C_x \cdot w_C + D_x \cdot w_D = T_x \quad (5)$$

For example, if a flight from San Diego to Orlando (H to G in the network of FIG. 8) cost $250, left at 7:00 p.m., was on a 10 year old 757, and had no meal or beverage service, its neural attribute values would be +3, 0, −5, and −3, respectively, providing a threshold for that trail of:

$$T_{G-H} = 3 \cdot 0.9 + 0 \cdot 0.7 + -5 \cdot 0.4 + -3 \cdot 0.1 = 2.2$$

If the same flight continued on to Cincinnati (F) with no extra charge, the neural attribute values would be +5, 0, −3, and −3, respectively, to provide a threshold $T_{H-F}$ of 4.08. (Note that an additional attribute could be included in each path relating to whether a change of planes was required, in which case, this particular path would rate a 0, for example, since this attribute may be relatively neutral, while a required change of planes, which is an inconvenience, might have a neural attribute value of −5.)

The thresholds for each of the other possible trails in the network, i.e., other "hops" in the flight from San Diego to Syracuse, are determined in a similar manner, after which the best path or route can be determined by iteratively comparing the trails against their respective thresholds after sequentially adjusting the weights in order of priority. Since there are typically multiple flights between two points, a single trail may have a number of different sets of attribute values (the primary difference being departure time, although cost may also vary with departure time). Each of these could be separately considered as possible trails within the overall path from the source to the destination.

In the case of physical transportation, such as air flight, it clearly would be undesirable to take a flight following an equivalent path to that indicated as best for telecommunications in FIG. 8, which follows four paths, doubling back on itself and heading west after having reached Minneapolis (C) before heading east again. This can be avoided by limiting the number of paths within any given combination of paths. In this example, three might be a reasonable maximum. This could similarly be specified by the passenger by limiting analysis to combinations of three or fewer trails to complete the route, which would leave open the following combinations (based upon the network of FIG. 8) to complete his or her travel:

TABLE 9

H–I
H–A–I
H–A–C–I
H–G–C–I
H–G–F–I
H–A–J–I
H–E–C–I

Attributes which are considered to be dynamic will vary at different rates. Since weather conditions can change rapidly, including the attribute of current weather conditions along the trail or at a connection point (node) would only be valuable for travelers who make their travel arrangements shortly before departure. Thus, for advance reservations, while the weather may be included as an attribute of the class consisting of trails, since it is a dynamic attribute, it may be set at 0 and given a weight of zero so that it does not figure into the evaluation in this situation. Where circumstances permit, the following exemplary attribute values could be included in the determination of the preferred route:

TABLE 10

| PHYSICAL ATTRIBUTE "E" (CURRENT WEATHER) | NEURAL ATTRIBUTE |
| --- | --- |
| CLEAR/NO WIND | +5 |
| OVERCAST/LIGHT WIND | +3 |
| LIGHT RAIN/MODERATE WIND | 0 |
| HEAVY RAIN/SNOW | −3 |
| BLIZZARD/HIGH WIND/THUNDERSTORMS | −5 |

Since many regional weather patterns are seasonal, e.g., extended winter conditions in the midwest or northeast, or monsoon season in tropical areas, the frequency of change will decrease relative to day-to-day weather changes such as to allow general advance considerations of weather conditions to be made. These might be translated into air movement (turbulence) or other factors that could effect how safe or smooth a flight might be (e.g., potential for icing), for example:

TABLE 11

| PHYSICAL ATTRIBUTE "F" (SEASONAL WEATHER) | NEURAL ATTRIBUTE |
|---|---|
| GENERALLY CALM | +5 |
| LIGHT AIR TURBULENCE | +3 |
| MODERATE TURBULENCE | 0 |
| ICE OR SNOW | −3 |
| HEAVY TURBULENCE | −5 |

As with the generally static attributes, where appropriate, the dynamic attributes will be weighted according to the traveler's priorities and will be added to the equation for determining the input values for any given trail within the network. A new threshold will be determined based upon the change in neural attribute value of the dynamic attribute, and the weights will be adjusted in order of priority using the above-described iterative process until a best path or route is identified.

The above method provides a significant advantage over existing trial and error practices, where a prospective passenger may provide the dates of travel and desired time of departure, and the travel agent searches for flights filling the basic description, identifying an airline, determining availability of the flight, including any connections and providing information about cost. If that flight is unavailable, is much more expensive than a competing airline, has an unduly long layover, or some other unacceptable feature, the procedure is repeated until an acceptable combination is achieved, which can be time consuming, inefficient, and incomplete, and is not cost effective. The inventive system and method provide means for rapidly comparing numerous options for completing travel from one point to another, and can be interconnected with airline computers to either establish availability of a flight once it has been identified as the best path, or to incorporate the availability of a flight or particular trail as a dynamic physical attribute of the trail. Further, once the best path is determined, the interconnection to the airline computers could be used to make the reservation.

Using the same procedure as described for airline reservations, other types of travel can also be managed to provide the most desirable path to reach a destination. Again referring to the network illustrated in FIG. 8, suppose a person wishes to drive from San Diego to Syracuse. Since the country is crisscrossed with a network of highways, the highways are the trails which run between nodes consisting of major cities. In this example, different attributes are applied to the trails than might be appropriate for telecommunications or air travel. For example, physical attributes could include scenery, road quality, speed limits, distance, topography, weather conditions, availability of food, lodging and fuel, to name a few. The neural attribute values of each of the trails would be stored in a computer memory, with the driver entering the weights to be applied to the attributes based upon his or her priorities. Using the same iterative technique, the inventive method can be used to identify the best path for driving from San Diego to Syracuse.

Along a similar vein, the inventive system and method may be used to dispatch and/or route emergency services such as police, fire or paramedics, or for transportation services such as taxis. In any of these examples, the network would be a street grid, the nodes can be stations or other locations from which the services are dispatched, or any intersection within the grid. The :rails are segments of the grid, i.e., the roads, that have physical attributes. Examples of important attributes for this particular purpose would be road width, number of traffic signals, whether traffic is one way, construction, traffic density and distance. Some of these attributes will be static, while others, such as traffic density and construction, will be dynamic. When a call is received, the dispatcher identifies the destination node, with the source node floating, since the source (the service to Le dispatched) is presumably available from a number of different nodes, which information the dispatcher will have as the result of the different available vehicles reporting their position, or, in a more sophisticated system, a satellite or other remote tracking system may be used to provide the information. Determination of which vehicle to dispatch will be provided by performing the above-described sequence for the best path between each of the vehicles and the destination, followed by performing a similar sequence to compare and determine the best vehicle to dispatch (the best path out of the best paths for each vehicle).

In the preferred embodiment, the system and method for management of interconnected resources is implemented on a conventional IBM compatible personal computer (PC) using the operating system Windows 95 (Microsoft, Inc., Seattle, Wash.) and the Visual C++ integrated development environment (IDE) (also developed by Microsoft). A copy of the program code is filed herewith as Microfiche Appendix A. The networks illustrated in FIGS. 7–9 are actual output displays generated by this program, where the selected path is indicated by dashed lines. As will be evident to those skilled in the software art, other computers and/or operating systems, e.g., UNIX, may be used with object-oriented programming languages, e.g., C++, which may further be enhanced using the Microsoft Foundation Class (MFC) library to provide the graphics and accessibility of typical Windows applications. It will also be apparent to those in the art that non-object-oriented programming languages, such as C, may be used with appropriate adaptations, however, an object-oriented language is preferred for its flexibility and ease of implementation.

The system and method for management of network resources provide real time, parallel evaluation of the best path within an interconnected plurality of nodes or points within a network using neural network principles and fuzzy logic. Rather than requiring calculation of actual numbers for allocating the network's resources, the inventive system and method utilizes relative, or fuzzy, values which are calculated using relative priorities determined by the network user, selecting the best choice as the first choice that crosses a pre-determined threshold, regardless of any actual numerical value provided by applying the transfer function lo the input variables.

The inventive system may be applied to identification of least cost paths, or other preferred paths, during original establishment of a network and may be used to update the preferred path as resources are added to or subtracted from the network on a real time basis. The inventive system can be operated in a monitoring mode to incorporate dynamic attributes and modify provisioning of the network resources to permit rapid establishment of back-up connections in event of breakdowns within the network or changes in the dynamic physical attributes. The preferred path can be the connection between a source and a destination in a telecommunications network, a power distribution network, or any network which has multiple interconnections that provide alternate routes for physical or electromagnetic communication between the source and destination. The inventive system and method is applicable to any size network, although attributes and weights may change depending on the type and size of the network.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A computer-based system for management of a connection oriented network according to a user's predetermined priorities, said network having a plurality of trails interconnecting a plurality of points, each trail of said plurality having a plurality of physical attributes (A, B, C, ...), the system comprising:
   means for assigning a plurality of attribute values (A1, A2, A3, ...) (B1, B2, B3, ...) (C1, C2, C3 ...) for each physical attribute (A, B, C, ...);
   a memory means for receiving and storing a data model of each said trail, said data model including a set of attribute values {A1, B1, C1, ...} for each said trail representative of said plurality of physical attributes;
   data entry means for entering an attribute weight {$W_A$, $W_B$, $W_C$, ...} for each physical attribute (A, B, C, ...) according to the user's priorities, wherein a higher priority of the user's priorities has a greater weight than a lower priority of the user's priorities; and
   a processing means for:
   (a) multiplying each attribute value of said set of attribute values by the corresponding attribute weight to provide a set of weighted attribute values {$A1*W_A$, $B1*W_B$, $C1*W_C$, ...} for each said trail;
   (b) summing said set of weighted attribute values for each said trail to generate an initial input value $IN_T$ for each said trail,
   (c) performing a transfer function on said initial input value according to a first equation $OUT_T=f(IN_T)$ to determine a threshold for each said trail,
   (d) adjusting one of said attribute weights of the set of weighted attribute values {$A1*W_A$, $B1*W_B$, $C1*W_C$, ...} for each said trail according to the user's priorities to provide a set of adjusted weighted attribute values for each said trail,
   (e) summing said set of adjusted weighted attribute values to provide an adjusted input value $IN_T$ (adjusted) for each said trail,
   (f) performing said transfer function on said adjusted input value for each said trail to generate an adjusted output value for each said trail where $OUT_T$ (adjusted)=$f(IN_T(\text{adjusted})-IN_T)$,
   (g) comparing said adjusted output value $OUT_T$ (adjusted) for each said trail to said threshold for each said trail to identify a single adjusted output value that crosses its corresponding said threshold, and, if no said single adjusted output value is identified which crosses its corresponding said threshold,
   (h) repeating steps (d)–(g) until said single adjusted output value is identified; and
   (i) generating an output signal indicating an identity of said trail of said plurality of trails having said single adjusted output value that crosses its corresponding threshold.

2. A computer-based system as in claim 1 wherein said network is an optical telecommunications network and said trails include fiber optic cables.

3. A computer-based system as in claim 2 wherein said plurality of physical attributes of said plurality of trails includes installation method.

4. A computer-based system as in claim 2 wherein said plurality of physical attributes of said plurality of trails includes cable length.

5. A computer-based system as in claim 2 wherein said plurality of physical attributes of said plurality of trails includes cost to expand.

6. A computer-based system as in claim 1 wherein said transfer function is a sigmoid function.

7. A computer-based system as in claim 1 wherein said processing means is in communication with said plurality of trails and receives information from said plurality of trails representing changes in said plurality of physical attributes and wherein said processing means adjusts said plurality of attribute values in response to said changes in said plurality of physical attributes.

8. A computer-based system as in claim 1 wherein said processing means is in communication with said plurality of trails and said output signal generates a control signal to said plurality of trails for selecting said trail having said single adjusted threshold value that crosses its corresponding threshold.

9. A computer-based system for allocating resources in a communications network comprising a plurality of interconnected resources forming a plurality of optional pathways for communicating between a source point and a destination point within said communications network, wherein each pathway of said plurality of optional pathways comprises at least one resource and each resource of said plurality of interconnected resources has a plurality of physical attributes A, B, ... to n, the computer-based system comprising:
   means for assigning each physical attribute of the plurality of physical attributes with an attribute value chosen from a set of attribute values A(i=1 to x), B(j=1 to y), ... to n(k=1 to z) for each said physical attribute;
   a memory means for receiving and storing a data representation of each said pathway, said data representation including a set of attribute values {A(i), B(j), ... to n(k)} for each said pathway representative of said plurality of physical attributes;
   data entry means for entering into the memory means a plurality of numerical weight values $W_A$, $W_B$, ... to $W_N$ representing pre-determined priorities for each of said plurality of physical attributes, wherein a higher priority of the pre-determined priorities has a higher numerical weight value than a lower priority of the pre-determined priorities, and for entering a designation of said source point and said destination point;
   a processing means connected to said memory means and said data entry means, the processing means for:
   (a) multiplying each attribute value of said set of attribute values by a corresponding weight of said plurality of numerical weight values to provide a set of weighted attribute values {$A(i) \cdot w_A$, $B(j) \cdot w_B$, ... $n(k) \cdot w_N$} for each said pathway,
   (b) summing said set of weighted attribute values for each said pathway to generate an initial input value for each said pathway given by IN(pathway)=$A(i) \cdot w_A + B(j) \cdot w_B + ... + n(k) \cdot w_N$,
   (c) performing a transfer function on said initial input value to determine a threshold for each said pathway,
   (d) adjusting at least one numerical weight value $W_N$ of said plurality of numerical weight values in an order according to the pre-determined priorities to provide a set of adjusted weighted attribute values for each said pathway,
   (e) summing said set of adjusted weighted attribute values to provide an adjusted input value for each said pathway given by IN(adjusted),
   (f) performing said transfer function on said adjusted input value for each said pathway to generate an adjusted output value for each said pathway given by OUT=f(IN(adjusted)),
   (g) comparing said adjusted output value for each said pathway to said threshold for each said pathway to identify a single optional pathway of said plurality of optional pathways having an adjusted output value that crosses its corresponding said threshold, and, if no said single optional pathway is identified,
   (h) repeating steps (d)–(g), until said single optional pathway of said plurality of optional pathways is identified, and (i) generating an output signal indicating an identity of said single optional pathway.

10. A computer-based system as in claim 9 wherein each said resource is a fiber optic cable terminated at each end by a device for transmitting/receiving a signal conducted through said fiber optic cable.

11. A computer-based system as in claim 9 wherein each said resource is an electrical power transmission line terminated at each end by a device for transmitting/receiving electrical power.

12. A computer-based system as in claim 9 wherein each said resource is an airline route terminated at each end by an airport.

13. A method for allocating resources in a connection oriented network based upon a pre-determined set of priorities, wherein each resource has a plurality of physical attributes, the method comprising:

- assigning a plurality of numerical attribute values corresponding to said plurality of physical attributes for each said resource, said plurality of numerical attribute values for each resource representable as a numerical attribute set={a1, b1 . . . to n1]; and
- storing said plurality of numerical attribute values into a computer memory;
- entering into the computer memory a plurality of numerical weight values w(a), w(b), . . . to w(n), . . . for each physical attribute representative of said pre-determined set of priorities;
- allocating a resource of the connection oriented network by processing the numerical weight values and the numerical attribute values, the method of processing comprising the steps of;
  - multiplying each numerical attribute value of said plurality of numerical attribute values by a corresponding numerical weight value of said plurality of numerical weight values to provide a set of weighted attribute values for each resource given by a weighted attribute set={a1*w(a), b1*w(b), . . . , n1*w(n)} for each resource;
  - adding said set of weighted attribute values for each said resource to generate an initial input value for each said resource;
  - performing a transfer function on said initial input value to determine a threshold for each said resource;
  - adjusting one of said plurality of numerical weight values according to said pre-determined set of priorities to provide a set of adjusted weighted attribute values;
  - adding said set of adjusted weighted attribute values to provide an adjusted input value for each said resource;
  - performing said transfer function on said adjusted input value for each said resource to generate an adjusted output value for each said resource;
  - comparing said adjusted output value to said threshold for each said resource to identify a single resource having said adjusted output value that crosses its corresponding said threshold;
  - if no said single resource is identified which has an adjusted output value that crosses its corresponding said threshold, repeating the steps of adjusting one of said plurality of numerical weight values, adding said set of adjusted weighted attribute values, performing said transfer function on said adjusted input value, and comparing said adjusted output value to said threshold for each said resource until said single adjusted output value is identified; and
  - generating an output signal indicating an identity of said single resource.

14. The method of claim 13 further comprising the step of adjusting one of said plurality of numerical attribute values when a corresponding one of said plurality of physical attributes changes.

15. The method of claim 14 further comprising the step of monitoring the network to determine whether said one of said plurality of physical attributes has changed.

16. The method of claim 13 wherein said network is an optical telecommunications network and said resources include fiber optic cables.

17. The method of claim 16 wherein said plurality of physical attributes includes installation method.

18. The method of claim 16 wherein said plurality of physical attributes includes cable length.

19. The method of claim 16 wherein said plurality of physical attributes includes cost to expand.

20. The method of claim 16 wherein the steps of performing said transfer function comprise applying a sigmoid function to said input values and adjusted input values.

21. The method of claim 13 wherein said network is a ground transportation grid and said resources include roadways.

22. The method of claim 13 wherein said network is an air transportation grid and said resources include airline flight paths.

23. A method for allocating a plurality of resources in a connection oriented network based upon a pre-determined set of priorities, wherein each resource r of said plurality has a plurality of physical attributes representable by a set of numerical values {A1, A2, . . . Ax}, the method comprising:

- creating a representation of said resources of said connection oriented network;
- storing said representation into a computer memory;
- storing said set of numerical attribute values into said representation in the computer memory;
- entering into said representation in the computer memory a plurality of initial numerical weight values w(A1), w(A2), . . . W(Ax) representative of said pre-determined set of priorities, with one initial numerical weight value of said plurality of initial numerical weight values corresponding to each physical attribute of said plurality of physical attributes;
- multiplying each said initial numerical weight value with its corresponding said numerical attribute value to generate a plurality of weighted attribute values A1*w(A1), A2*w(A2), . . . Ax*w(Ax);
- summing the plurality of weighted attribute values for each said resource r to generate a summed weighted attribute value given by a first equation IN(r)=A1*w(A1)+A2*w(A2)+ . . . +Ax*w(Ax);
- applying a threshold function to the summed weighted attribute value to provide a relative resource value for comparison to a threshold value;
- using a neural network training method to adjust at least one initial numerical weight value of said plurality of initial weight values and repeating the steps of multiplying, summing and applying a threshold function until the single relative resource value exceeds the threshold value; and
- outputting a signal indicating at least one resource of said plurality of resources that corresponds to the single relative resource value.

24. The method of claim 23 wherein the neural network training method is backpropagation.

* * * * *